United States Patent
Bening et al.

(12)

(10) Patent No.: US 6,218,478 B1
(45) Date of Patent: Apr. 17, 2001

(54) DEPROTECTION OF POLYMERS PREPARED WITH SILYLOXY PROTECTED FUNCTIONAL INITIATORS BY REACTION WITH HYDRIDE REDUCING AGENTS

(75) Inventors: Robert Charles Bening, Katy; Carl Lesley Willis, Houston, both of TX (US)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 09/379,843

(22) Filed: Aug. 24, 1999

Related U.S. Application Data

(60) Provisional application No. 60/098,892, filed on Sep. 2, 1998.

(51) Int. Cl.$^7$ ................................................... C08C 19/02
(52) U.S. Cl. ........................ 525/338; 525/339; 525/333.2; 525/333.3
(58) Field of Search ................................. 525/338, 339, 525/333.2, 333.3

(56) References Cited

U.S. PATENT DOCUMENTS 3,499,020    3/1970    Robinson ..................... 260/448.2
5,416,168    5/1995    Willis et al. ..................... 525/333.2

*Primary Examiner*—Terressa M. Boykin
(74) *Attorney, Agent, or Firm*—Donald F. Haas

(57) ABSTRACT

The present invention provides a process for making functionalized polymers comprising the steps of (a) initiating polymerization of an unsaturated monomer with a lithium initiator having the structure $R^1R^2R^3Si-O-A-Li$ wherein A is a branched or straight chain bridging group having at least two carbon atoms, $R^1, R^2$, and $R^3$ are alkyl, alkoxy, aryl, or alkaryl groups having from 1 to 10 carbon atoms, thus producing a functionalized polymer which has a protecting silyl group at one end thereof; and (b) contacting the protected polymer with aqueous acid to remove residual lithium, and (c) contacting the protected polymer with from 1 to 10 equivalents of an organic or inorganic hydride; and (d) contacting the resulting solution with aqueous acid, and (e) recovering a linear or branched deprotected polymer having one or more terminal functional groups.

14 Claims, No Drawings

DEPROTECTION OF POLYMERS PREPARED WITH SILYLOXY PROTECTED FUNCTIONAL INITIATORS BY REACTION WITH HYDRIDE REDUCING AGENTS

This application claims the benefit of U.S. Provisional Application No. 60/098,892, filed Sep. 2, 1998, the entire disclosure of which is hereby incorporated by reference.

FIELD OF THE INVENTION

This invention relates to anionic polymerization of monomers to produce functionalized polymers with silyloxy reagents used as protected functional initiators for the synthesis of these polymers. More particularly, the present invention relates to an improved process for deprotection of such polymers made with silyloxy protected functional initiators.

BACKGROUND OF THE INVENTION

Anionic polymerization of conjugated dienes with lithium initiators, such as sec-butyllithium, and hydrogenation of residual unsaturation has been described in many references including U.S. Pat. No. Re. 27,145 which teaches a relationship between the amount of 1,2-addition of butadiene and the glass transition temperatures of the hydrogenated butadiene polymers. The capping of living anionic polymers to form functional end groups is described in U.S. Pat. Nos. 4,417,029, 4,518,753, and 4,753,991. Of particular interest for the present invention are anionic polymers that are capped on one or more ends with hydroxyl, carboxyl, phenol, epoxy, or amine groups.

Anionic polymerization using protected functional initiators having the structure $R^1R^2R^3Si$—O—A'—Li is described in WO 91/12277 wherein $R^1$, $R^2$, and $R^3$ are preferably alkyl, alkoxy, aryl, or alkaryl groups having from 1 to 10 carbon atoms, and A' is preferably a branched or straight chain bridging group having at least 2 carbon atoms. $R^1$, $R^2$, and $R^3$ are preferably not all $CH_3$. The bridging group (A') is most preferably a straight chain alkyl having from 3 to 10 carbon atoms. A preferred protected initiator wherein all of the R groups are methyl groups is described in U.S. Pat. No. 5,416,168. The polymers produced by these initiators are readily endcapped and hydrogenated to form anionic polymers having one or more terminal functional groups under commercially attractive conditions.

As described in U.S. Pat. No. 5,416,168, deprotection has preferably been accomplished by acid-catalyzed hydrolysis although contact with dilute aqueous base solution is also possible. One preferred process involves dissolving methane sulfonic acid in water in an alcohol and then adding this to the polymer cement (the solution/slurry/suspension of the polymer in the polymerization solvent). Under appropriate conditions, deprotection is also known to be able to be accomplished by contacting the polymer with aqueous mineral acid.

These deprotection processes are robust and are capable of achieving satisfactory results. However, the acid catalyzed method suffers from two significant deficiencies. The principle coproduct of this reaction, hexamethyldisiloxane (HMDS), is difficult to remove from the process solvent which is normally used, cyclohexane, greatly complicating solvent recycle. In addition, the extent of hydrolysis generally fails to exceed 97 percent. This appears to be an equilibrium limitation. Removal of the solvent and volatile silicon compounds, followed by addition of clean cyclohexane and a second aqueous acid contact, results in complete hydrolysis but this process is expensive and time consuming.

It can be seen that there is a need for a process that accomplishes a high degree of deprotection without the formation of difficult to remove silicon compounds. The present process provides these advantages.

SUMMARY OF THE INVENTION

The present invention provides a process for making functionalized polymers comprising the steps of (a) initiating polymerization of an unsaturated monomer with a lithium initiator having the structure $R^1R^2R^3Si$—O—A—Li wherein A is a branched or straight chain bridging group having at least two carbon atoms, $R^1$, $R^2$, and $R^3$ are alkyl, preferably methyl, alkoxy, aryl, or alkaryl groups having from 1 to 10 carbon atoms, thus producing a functionalized polymer which has a protecting silyl group at one end thereof; and (b) contacting the protected polymer with aqueous acid to remove residual lithium, and (c) contacting the protected polymer with from 1 to 10 equivalents of an organic or inorganic hydride; and (d) contacting the resulting solution with aqueous acid, and (e) recovering a linear or branched deprotected polymer having one or more terminal functional groups.

This novel deprotection process generates an easily separated co-product and proceeds to completion in one step. Preferably, the hydride is a hydrocarbon soluble hydride including aluminum hydrides and boranes. Diisobutyl aluminum hydride is particularly preferred. Less soluble hydride reducing agents, such as lithium aluminum hydride and sodium borohydride, and simple hydride salts, such as LiH, should also work in the presence of polar solvents.

DETAILED DESCRIPTION OF THE INVENTION

The polymerization of unsaturated monomers with protected functional initiators as described above is described in detail in U.S. Pat. No. 5,416,168, which is herein incorporated by reference. Following those teachings, a polymer is produced which has a functional group on one end and on the other end has a functional group which has been reacted with a silyl alkoxy protected functional initiator which serves as a "masked" or "protected" alcohol, capable of conversion to a primary, neopentyl-type alcohol group after polymerization is completed by reaction with acids or bases under mild, low cost conditions.

The lithium initiator process is well known as described in U.S. Pat. No. 4,039,593 and Re. No. 27,145 which descriptions are incorporated herein by reference. Typical living polymer structures that can be made with lithium initiators such as Structure (2) include:

X—B—Li
X—B/A—Li
X—A—B—Li
X—B—A—Li
X—B—B/A—Li
X—B/A—B—Li
X—A—B—A—Li wherein B represents polymerized units of one or more conjugated diene hydrocarbons, A represents polymerized units of one or more vinyl aromatic compounds, B/A represents random polymerized units of the conjugated diene hydrocarbons and the vinyl aromatic monomers, and X is the residue of the lithium initiator. The living polymers are terminated as linear polymers, coupled to form branched polymers, or capped to add an additional terminal functional group by conventional means such as addition of methanol, silicon tetrachloride, divinylbenzene, or ethylene oxide. If the polymer is to be capped, the capping step is usually between polymerization and contact with aqueous acid to remove lithium. In the present invention, X is a trimethylsilyl ether group and cleavage of the trimethylsilyl ether leaves a neopentyl-like primary alcohol group in this position.

The initiators of the present invention are very active at room temperature and polymerization is preferably initiated at a temperature from 15° C. to 60° C., most preferably from 30° C. to 40° C. Polymerizations can be carried out over a range of solids levels, preferably from about 5% to about 80% wt polymer, most preferably from about 10% to about 40% wt.

Anionic polymerization is often terminated by addition of water to remove the lithium as lithium hydroxide (LiOH) or by addition of an alcohol (ROH) to remove the lithium as a lithium alkoxide (LiOR). Polymers prepared from initiators of the present invention and terminated in this way will be monohydroxy functional materials (mono-ols) after removal of the trimethylsilyl protecting group. To prepare polymers having additional terminal functional groups, the living polymer chains are preferably reacted (end capped) with hydroxyl (—OH), carboxyl (—$CO_2H$), phenol (ArOH), epoxy, or amine groups by reaction with ethylene oxide (—OH), oxetane (—OH), 2,2-dimethyloxetane (—OH), carbon dioxide (—$CO_2H$), a protected hydroxystyrene monomer (ArOH), ethylene oxide plus epichlorohydrin (epoxy), or the aziridine compounds listed in U.S. Pat. No. 4,791,174 (amine). For the preparation of telechelic diols, the preferred process is to terminate with 1 to 10 equivalents, most preferably 1 to 2 equivalents, of ethylene oxide at 30° C.–50° C. This reaction is quite rapid; reaction times from 5 to 30 minutes yield acceptable results.

Hydrogenation of at least 90%, preferably at least 95%, of the unsaturation in low molecular weight butadiene polymers is achieved with nickel catalysts as described in U.S. Pat. No. Re. 27,145 and U.S. Pat. No. 4,970,254 which are incorporated by reference herein. The preferred nickel catalyst is a mixture of nickel 2-ethylhexanoate and triethylaluminum described in more detail in the examples. The polymer can be hydrogenated before or after deprotection.

After polymerization and, optionally, hydrogenation and washing of the polymer, the silyloxy group at the end of the polymer chain is removed to generate the desired primary hydroxyl-functional group on the polymer. In the present invention, this deprotection step is carried out by removing residual lithium by contacting the polymer with aqueous acid, contacting the protected polymer with from 1 to 10 equivalents of an organic or inorganic hydride, preferably 2 to 10, especially if the polymer is end capped with ethylene oxide (more than 10 works but provides no additional benefit), most preferably 2 to 3, contacting the resulting solution with aqueous acid, and then recovering the deprotected polymer having one or more terminal functional groups. It is preferred that the protected polymer be contacted with at least two equivalents of the hydride because it is presumed that one equivalent reacts with the terminal hydroxy group on the polymer which has not been protected.

The process is preferably carried out at a temperature of from 25 to 80° C., most preferably 50 to 70° C. Essentially complete conversion of the protected polymer to the deprotected polymer is achieved in from 60 to 120 minutes. The principle co-product of this deprotection reaction is $R_3$ silane, which is relatively inert and easily separated from the polymerization solvent, usually cyclohexane, by distillation. It is preferred that the water in the solution be less than 0.1 percent by weight because extra hydride may be required if more water is present.

The preferred hydrides for use in the present invention are hydrocarbon soluble hydrides, especially aluminum hydrides and boranes. Diisobutyl aluminum hydride is especially preferred because it is readily obtained, soluble in cyclohexane, and relatively inexpensive. Less soluble hydride reducing agents may work in the presence of polar solvents. These include lithium aluminum hydride and sodium borohydride, and also simple hydride salts, such as LiH. The reactivity of hydride salts is expected to improve substantially in the presence of strong metal chelating agents, such as crown ethers or cryptands.

The solution including the hydride is contacted with aqueous acid. This hydrolyzes the aluminum-oxygen bond (or lithium or other metal which may be present in the hydride), generating the desired diol product. It is preferable to add sufficient aqueous acid, of sufficient strength, to ensure that all of the liberated aluminum or other metal is soluble in the aqueous phase. Mineral acids (phosphoric, sulfuric, hydrochloric acids, etc.) are generally preferable, as these acids are inexpensive, readily available, and have little tendency to partition into the organic phase. Acids that partition into the organic phase may interfere with hydrogenation. The quantity and strength of the acid used are chosen so that the salts that are produced are soluble. If dilute phosphoric acid is used, it is preferable to provide in excess of three moles of phosphoric acid per mole of aluminum. It is also preferable to add the cement to the aqueous acid because adding them in the reverse order can lead to gel formation due to the linking of chain ends via Al—O—Al bonds prior to complete hydrolysis.

The hydride reduction process of the present invention forms a volatile silane, trimethyl silane in the case where all of the R groups are methyl groups. Trimethyl silane has a boiling point of 6.7° C. This minimizes the problems with purification of the solvent. Also, the hydride deprotection reaction appears to proceed to completion at equilibrium.

The process of the present invention works well on unhydrogenated terminated polymers and also on hydrogenated polymers from which the catalyst residue has been removed. The process does not work well in the presence of the hydrogenation catalyst.

EXAMPLES

Example 1

We weighed 2 grams of trimethylsiloxy-2,2-dimethylpropane into a round-bottom flask in the dry box. We then added 7.42 grams of a 24.7% solution of diisobutylaluminum hydride (DIBAL-H) in heptane to the flask, with stirring. No observable reaction or exotherm occurred. We let the solution react at room temperature for six days and then analyzed an aliquot by $^1$H NMR. The analysis indicated that a significant fraction of the trimethylsilyl ether groups had been cleaved. We repeated the experiment using the same quantities of reagents, except that the solution was heated between 55° C. and 60° C. for 3 hours. As in the previous experiment, $^1$H NMR indicated significant cleavage of the trimethylsilyl ether.

Example 2

We dried a sample of a 90 percent protected polymer (3000 weight average molecular weight polybutadiene initiated with 2,2-dimethyl-3-trimethyl-siloxy-1-propyllithium, end capped with ethylene oxide, and washed with aqueous acid to remove lithium) to a final water content of about 500 ppm and dissolved this in cyclohexane at 20 percent by weight. We heated this cement to 60° C. under nitrogen and added 2.05 equivalents of DIBAL-H (as 25% solution in heptane). Substantial gas evolution occurred until about half of the reagent was added. This was presumably due to reaction of the ethylene oxide—capped end with DIBAL-H (evolves $H_2$). The viscosity of the solution began to increase, reaching a maximum at about 20 minutes. The solution did not gel. Samples were taken for NMR at 30 minutes and 60 minutes. The viscosity seemed to decrease slightly in the last half-hour. Both the samples and the reactor contents were worked up by adding 10% wt. aqueous phosphoric acid at a 0.5:1 aqueous acid:cement phase ratio. Rapid gas evolution occurred, but the temperature of the reactor contents did not increase significantly. A white, flocculent precipitate (aluminum phosphate) began to form, but dissolved when all of the aqueous acid was added. In the end, the cement was almost clear and water white.

NMR of the 30 minute sample showed 97 percent deprotection. The 60 minute sample showed 99 percent deprotection. The cement NMR was particularly interesting. The only Si species present was Bd-TMS. Apparently the trimethylsilane was so volatile it weathered-off during the reaction or work-up.

Example 3

A hydrogenated polymer cement of a functional polymer that had been polymerized using 2,2-dimethyl-3-trimethyl-siloxy-1-propyllithium having a number average molecular weight of 3100 that had been through catalyst wash and concentrated to about 40 percent solids was dried in a rotary evaporator. 81 grams (0.026 moles) of this product was dissolved to 20 percent weight in dry cyclohexane. The solution was heated to 60° C. under nitrogen and then 28.6 grams (0.05 moles) of 24.7 percent weight DIBAL-H solution was slowly added. Vigorous gas evolution occurred until about half of the solution was added. The reaction was allowed to proceed for a total of 60 minutes at 60° C. The solution became substantially more viscous within the first 20 minutes. Samples were taken into aqueous phosphoric acid for $^1$H NMR at 30 and 60 minutes. After one hour, sufficient 10 percent weight aqueous phosphoric acid was added to the stirred vessel to achieve a phase ratio of 0.5:1 aqueous acid:cement (4.2:1 molar ratio phosphoric acid:aluminum). Addition of the aqueous acid resulted in vigorous gas evolution. The cement viscosity rose briefly as the acid was being added and then decreased to that of the original cement after all of the aqueous acid has been added. The contents separated into two clear phases within minutes of shutting off of the stirrer. $^1$H NMR analysis shows that after 60 minutes, 99 percent of the polymer had been deprotected.

Example 4

400 grams of the concentrate of Example 3 (actual solids 40.8 percent by weight; 0.051 moles of polymer) was heated to 60° C. under nitrogen in a resin kettle. Then 58.6 grams (0.10 moles) of 24.7 percent weight DIBAL-H solution was slowly added. As before, this was accompanied by vigorous gas evolution. The reaction was allowed to proceed for 60 minutes. Samples were taken at 30 and 60 minutes. The cement was washed with 5 percent weight aqueous sulphuric acid at a 0.5:1 phase ratio as described above. The solution reached a gel-like state during the acid addition and the cement remained hazy. NMR analysis revealed that the deprotection reaction was 89 percent complete.

Example 5

840 grams (0.11 moles of polymer) of the concentrate of Example 3 was contacted with 130 grams (0.22 moles) of the same DIBAL-H solution at 60° C. in a 2 liter Buchi glass autoclave reactor. Samples were taken at 30, 90, and 120 minutes. The high viscosity of the solution made sampling difficult. After two hours, an additional 30.3 grams (0.5 moles) of the DIBAL-H solution was added. No gas was evolved. The acid:aluminum ratio was 1.5. One hour after addition of the final DIBAL-H charge, a sample was taken for $^1$H NMR analysis. NMR analysis reveals that the deprotection reaction was 99 percent complete 60 minutes after the second charge of DIBAL-H was added.

We claim:

1. A process for making functionalized polymers, comprising:

(a) initiating polymerization of an unsaturated monomer with a lithium initiator having the structure $R^1R^2R^3Si$—O—A—Li to produce a protected polymer having a silyl group at one end thereof, wherein A is a branched or straight chain bridging group having at least two carbon atoms, and wherein $R^1, R^2$, and $R^3$ are alkyl, alkoxy, aryl, or alkaryl groups having from 1 to 10 carbon atoms; and (b) contacting the protected polymer with an aqueous acid;

(c) contacting the protected polymer with 1 to 10 equivalents of an organic or inorganic hydride;

(d) contacting a resulting solution with aqueous acid; and then (e) recovering a linear or branched deprotected polymer having one or more terminal functional groups.

2. The process of claim 1 wherein the protected polymer is contacted with at least two equivalents of the hydride.

3. The process of claim 1 wherein $R^1$, $R^2$, and $R^3$ are methyl groups.

4. The process of claim 1 wherein the deprotected polymer is hydrogenated.

5. The process of claim 1 wherein the protected polymer is hydrogenated before deprotection.

6. A process for making functionalized polymers, comprising:

(a) initiating polymerization of an unsaturated monomer with a lithium initiator having the structure $R^1R^2R^3Si$—O—A—Li to produce a protected polymer having a silyl group at one end thereof, wherein A is a branched or straight chain bridging group having at least two carbon atoms, and wherein $R^1, R^2$, and $R^3$ are alkyl, alkoxy, aryl, or alkaryl groups having from 1 to 10 carbon atoms;

(b) capping the protected polymer to add an additional terminal functional group;

(c) contacting the protected polymer with aqueous acid;

(d) contacting the protected polymer with 1 to 10 equivalents of an organic or inorganic hydride;

(e) contacting a resulting solution with an aqueous acid; and then (f) recovering a linear or branched deprotected polymer having one or more terminal functional groups.

7. The process of claim 6 wherein the protected polymer is contacted with at least two equivalents of the hydride.

8. The process of claim 6 wherein $R^1$, $R^2$, and $R^3$ are methyl groups.

9. The process of claim 6 wherein the deprotected polymer is hydrogenated.

10. The process of claim 6 wherein the protected polymer is hydrogenated before deprotection.

11. A process for making functionalized polymers, comprising:

(a) initiating polymerization of an unsaturated monomer with a lithium initiator having the structure $(CH_3)_3Si$—O—A—Li to produce a protected polymer having a silyl group at one end thereof, wherein A is a branched or straight chain bridging group having at least two carbon atoms;

(b) capping the protected polymer to add an additional terminal functional group;

(c) contacting the protected polymer with an aqueous acid;

(d) contacting the protected polymer with 2 to 10 equivalents of an organic or inorganic hydride;

(e) contacting a resulting solution with an aqueous acid; and then (f) recovering a linear or branched deprotected polymer having one or more terminal functional groups.

12. The process of claim 11 wherein the deprotected polymer is hydrogenated.

13. The process of claim 11 wherein the protected polymer is hydrogenated before deprotection.

14. The process of claim 11 wherein the deprotected polymer has two terminal functional groups.

\* \* \* \* \*